United States Patent [19]

Ishiguro et al.

[11] Patent Number: 5,687,400

[45] Date of Patent: Nov. 11, 1997

[54] BUILT-IN FLASH CAMERA

[75] Inventors: Minoru Ishiguro; Minoru Takahashi, both of Omiya, Japan

[73] Assignee: Fuji Photo Optical Co., Ltd., Saitama, Japan

[21] Appl. No.: 628,337

[22] Filed: Apr. 5, 1996

[30] Foreign Application Priority Data

Apr. 14, 1995 [JP] Japan .................................. 7-089661

[51] Int. Cl.⁶ ............................................... G03B 15/05
[52] U.S. Cl. ................................. 396/61; 396/63; 396/64
[58] Field of Search ............................... 354/412, 413, 354/419, 127.13, 129, 137, 138; 396/61, 62, 63, 64

[56] References Cited

U.S. PATENT DOCUMENTS 4,941,009 7/1990 Yoshida .................................. 354/402
5,255,047 10/1993 Ishimaru et al. ...................... 354/416

FOREIGN PATENT DOCUMENTS 56-149022 11/1981 Japan .
8-171118 7/1996 Japan .

*Primary Examiner*—Daniel P. Malley

[57] ABSTRACT

A photometry part measures a brightness within a shot visual field. A focusing part measures a distance up to a main subject. A focal length measuring part measures a focal length of a taking lens. A strobe light control part directs a strobe to flash regularly and decreases a strobe exposure gradually from a standard exposure in accordance with the measured parameters. The measured distance at which the exposure of the strobe is decreased, is defined as the strobe changeover distance. The strobe light control part sets the strobe changeover distance to be long as the focal length at photographing becomes long, so that the exposure of the main subject on the image surface can be kept proper.

5 Claims, 11 Drawing Sheets

OPENING SHUTTER

STROBE FLASHING

EXPOSURE

STROBE FLASHING

EXPOSURE

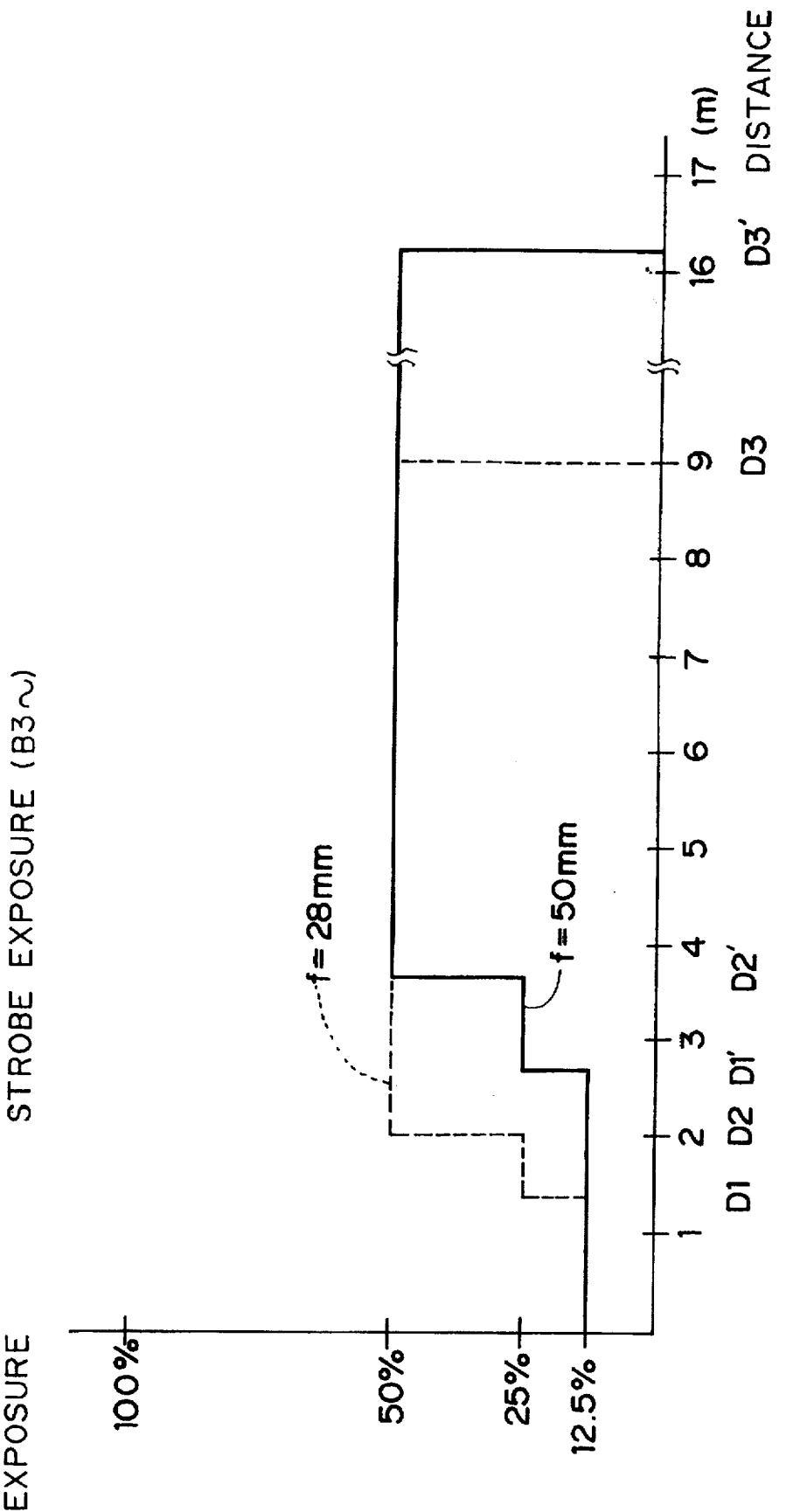

BUILT-IN FLASH CAMERA

BACKGROUND OF THE INVENTION

1. Field of the Invention

The present invention relates to a built-in flash camera and more particularly to a built-in flash camera provided with an automatic exposure function and an electronic flash (strobe) which is flashed regularly.

2. Description of the Related Art

When taking a picture under back lighting, there is a problem in that an object looks dark. Furthermore, the object is shadowed when taking a picture in the condition that the sun is Just above the object even though there is no back lighting. In order to prevent the above-mentioned problem, there is known a method for using the strobe regularly even in the daylight (regular flash type), so that a strobe light can be added to the exposure of the external light.

Because the latitude of a negative color film is large with respect to an overexposure, it is preferable to always use the strobe when the negative color film is used.

The conventional built-in flash camera of the regular flash type is disclosed in, for example, a Japanese Patent Application Laid-open No.56-149022.

There is a proposed another built-in flash camera in which the strobe is flashed regularly. In this camera, the exposure of the external light is gradually controlled and the exposure of the strobe light is also gradually controlled in accordance with the subject distance (refer to the Japanese Patent Application No. 6-255599).

However, if the conventional built-in flash camera, a magnification (a focal length) change by a zooming is not taken into consideration with respect to a control of a strobe light exposure. When the magnification is changed by a zoom lens, there is a problem in that the ratio of a main subject in an angle of view changes and the influence of the illumination by the strobe light also changes.

That is, when the change of the magnification is not taken into consideration with respect to the control of the strobe exposure, the ratio of the main subject in the angle of view increases if the magnification is enlarged. Therefore, the quantity of light on the subject surface increases due to the strobe light, which is illuminated on the main subject (for example, a person), and the subject is washed out on the photograph. On the other hand, when the magnification is reduced, the ratio of the main subject in the angle of view decreases, and the quantity of light on the main subject surface also decreases. As a result, there is a problem in that the balance of light between the person and the background is lost, and the atmosphere in the photograph is ruined.

The strobe is flashed in a fixed exposure even though the quantity of light on the subject surface in the angle of view changes according to the magnification as described above. Therefore, the quantity of light on the subject on an image surface changes according to the magnification even if the strobe exposure is previously set so as to be controlled appropriately in accordance with the subject distance. As a result, a good picture cannot be taken.

SUMMARY OF THE INVENTION

The present invention has been developed in view of the above-described circumstances, and has its object the provision of a built-in flash camera which controls a strobe so as to photograph a subject under an optimum exposure in accordance with a focal length of a taking lens or a magnification.

To achieve the above-mentioned object, a built-in flash camera includes a strobe therein and comprises a photometry part for measuring a brightness within a shot visual field, a focusing part for measuring a distance up to a subject within the shot visual field, a focal length measuring part for measuring a focal length f of a taking lens of the built-in camera, an automatic exposure mechanism for opening and closing a combination shutter and a stop blade so as to obtain a standard exposure under external light, of which brightness is more than a reference external light brightness, in accordance with the brightness measured by the photometry part, and a strobe light control part for directing the strobe to flash regularly in connection with the opening and closing shutter and for decreasing the exposure of the strobe from the standard exposure in accordance with the brightness measured by the photometry part and the distance measured by the focusing part, and the focal length measured by the focal length measuring part. The reference external light brightness is an external light brightness at which an optimum exposure is obtained in a predetermined shutter open time, and the standard exposure is the exposure in the reference external light brightness. The strobe light control part controls the strobe exposure, which is gradually decreased from the standard exposure with the measurement results being a parameter. A distance at which the decreased amount of the strobe light is changed, is defined as a strobe changeover distance. The strobe light control part sets a strobe changeover distance to be long as the focal length at photographing becomes long. When the focal length becomes longer, the ratio of the main subject in the shot visual field increases. As a result, the extent of contribution by the strobe light is increased, so that the exposure of the main subject on the image surface can be kept proper by making the strobe changeover distance longer.

Furthermore, to achieve the above-mentioned object, a magnification is measured instead of the focal length of the taking lens and a strobe changeover brightness is set to become higher as the ratio of the main subject in the shot visual field is decreased with the measured magnification being a parameter. The strobe changeover brightness is used for gradually decreasing the strobe exposure from the standard exposure as the measured brightness becomes large. As a result, the exposure of the main subject on the image surface can be kept proper.

Moreover, a reference focal length f0 is defined with respect to the taking lens, and the n th reference changeover distance Dn(f0), which is set with regard to the reference focal distance f0, is used, so that the n th strobe changeover distance Dn (f) in the focal length f is found by the following equation.

$$Dn(f) = Dn\,(f0) \times f/f0$$

As a result, the strobe changeover distance, where the exposure of the main subject on the image surface is not excessively large, can be easily found.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 10 is a graph explaining a relationship between a distance up to the main subject and a strobe exposure.

DESCRIPTION OF THE PREFERRED EMBODIMENT

Figure 1:
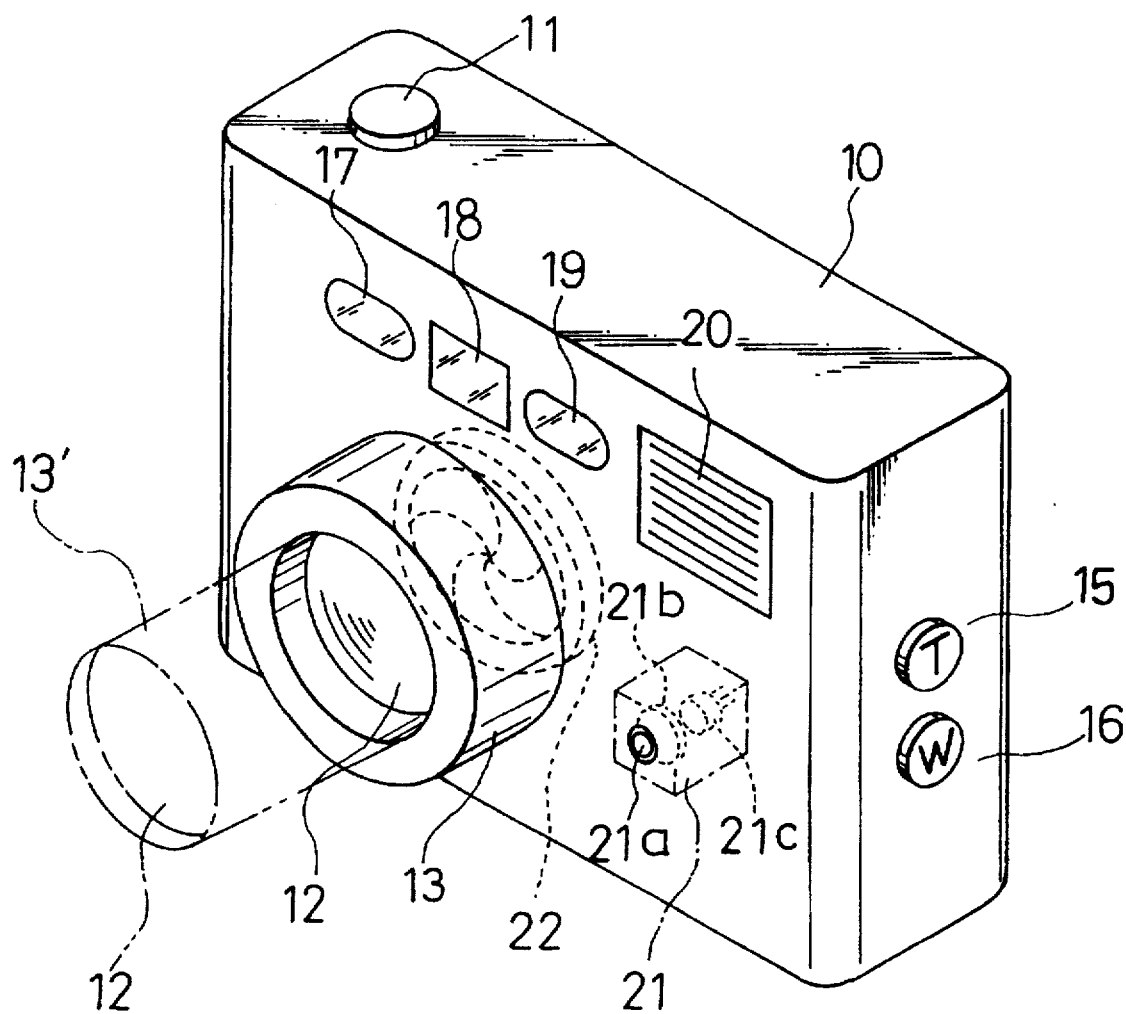
FIG. 1 is a perspective view illustrating an external appearance of an embodiment of a built-in flash camera according to the present invention.
Figure 2A:
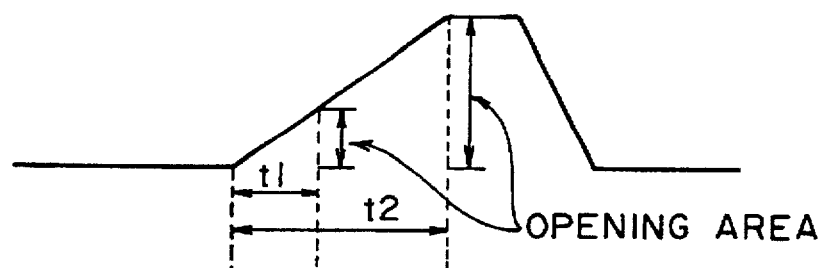
FIGS. 2(a), 2(b), 2(c), 2(d) and 2(e) are time charts illustrating a relationship between a shutter opening timing and a flash timing.
Figure 2B:
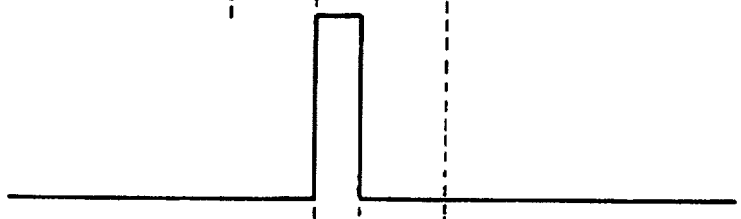
Figure 2C:
Figure 2D:
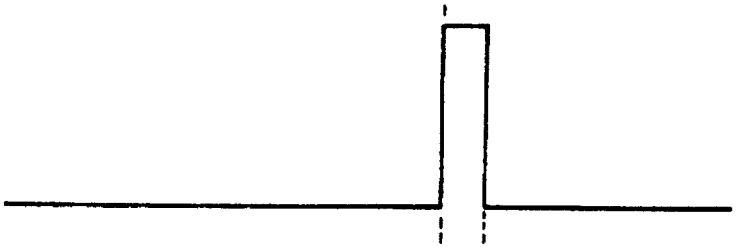
Figure 2E:
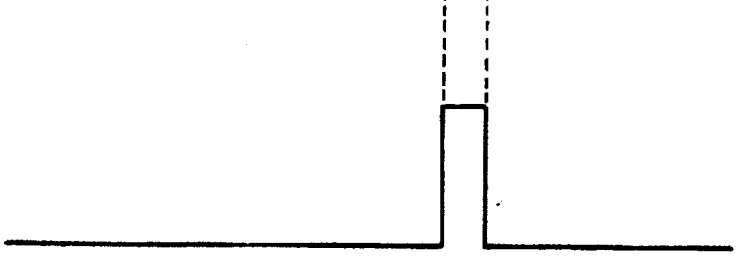

FIG. 1 is a perspective view illustrating an external appearance of an embodiment for a built-in flash camera according to the present invention. In the built-in flash camera of FIG. 1, a shutter button 11 is arranged on a top surface of a camera body 10, and a mirror barrel 13, in which a lens 12 is incorporated, is attached at a central portion on a front surface of the camera body 10.

The taking lens 12 is composed of a zoom lens, which comprises a plurality of lenses and a well-known lens mirror barrel drive device 14. When a telephoto switch 15 or a wideangle switch 16 is operated, the drive device 14 can move the lens and change the focal length. The movement value of the lens is measured by, for example, an encoder, etc., and a CPU 30 recognizes the current focal length.

Incidentally, the part indicated by a two-dot line in FIG. 1 shows such a situation that the telephoto switch 15 is operated and the lens mirror barrel 13' is moved forward. In this embodiment, the variable focal length range, which can be changed by zooming, is f=28 mm–50 mm. However, the focal length range may be others. Moreover, the taking lens 12 is not limited to one capable of changing its focal length sequentially. It is also possible to adopt a taking lens which changes the focal length gradually, and which changes the focal length in a telephoto/wideangle selection changeover method. Anyway, a means for measuring the focal length or a magnification at photographing is always required.

A projector 17, a finder 18, a light acceptor 19, and a strobe 20 are arranged at an upper portion of the front surface of the camera body from the left of the drawing. The projector 17 and the light acceptor 19 compose a focusing part for measuring a distance from the camera to the subject. The focusing part measures the distance on the basis of, for example, a principle of triangulation.

A photometry part 21, which measures the brightness of the external light within the visual field, is provided at the right side of the mirror barrel 13 on the front surface of the camera body 10. The photometry part 21 is provided with an incident window 21a which is formed on the surface of the camera body 10, a lens 21b which is arranged within the incident window 21a, and a light accepting element 21c in which a light accepting surface is arranged in a proximity of the image-forming position of the lens 21b.

The light accepting surface of the light accepting element 21c is arranged at a position displaced from an image-forming position of the lens 21b. Therefore, a perfect object image is not formed on the light accepting surface of the light accepting element 21c, and an average quantity of the external light in the whole visual field including the main subject is measured by the light accepting element 21c.

Furthermore, a shutter 22, which gives the required exposure to the film, is provided on the optical axis of the taking lens 12 within the camera body 10.

The strobe 20 is automatically flashed in response to a timing of the shutter opening. In this embodiment, the flash timing of the strobe 20 is subtly staggered from an open timing of the shutter 22, so that the exposure on the main subject surface can be adjusted.

How to adjust the exposure will be explained with reference to the time chart in FIG. 2. The time chart in FIG. 2 shows how much exposure can be obtained by flashing the strobe 20 at the time after the shutter 22 starts working. As shown in FIG. 2 (a), the opening area of the shutter 22 is still small in the case (see FIG. 2(b)) that the strobe is flashed when a time t1 has passed after the shutter starts working, and the light which exposes the film is small (see FIG. 2 (c)).

On the other hand, when the strobe is flashed when a time t2 has passed after the shutter starts working (see FIG. 2 (d)), the opening area of the shutter 22 is the largest, so the light which exposes the film is large. As a result, the exposure is almost twice as much as the exposure in the time t1 (see FIG. 2 (e)). Thus, the flash timing of the strobe 20 is adjusted so that the exposure of the strobe 20 can be freely adjusted without changing the emission quantity of the strobe 20.

In this embodiment, the flash timing of the strobe light for obtaining the optimum exposure at photographing is controlled by a focal length at photographing (photographing focal length f), a distance up to a main subject measured by the projector 17 and the acceptor 19, and the external light brightness in the shot visual field, which is measured by the photometry part 21.

Figure 3:
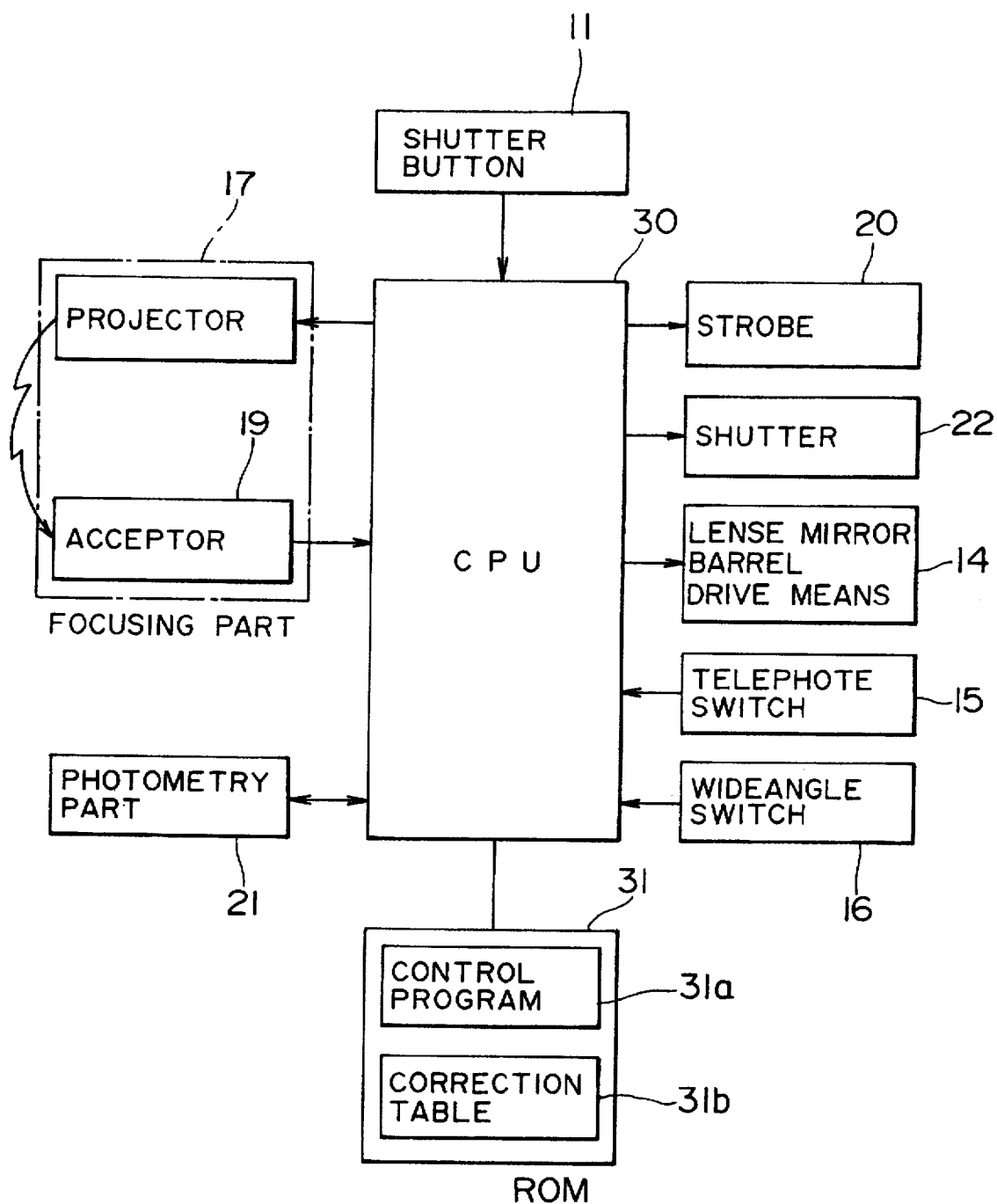
FIG. 3 is a block diagram illustrating a structure for controlling the flash timing.

FIG. 3 is a block diagram illustrating a structure for controlling a flash timing. As shown in FIG. 3, the flash timing is controlled mainly by the CPU 30 on the basis of a control program 31a, which is written in a ROM 31.

The CPU 30 receives a half-push signal or a full-push signal from the shutter button 11. The CPU 30, which receives the half-push signal from the shutter button 11, provides the projector 17 with a signal for measuring the distance between the camera and the main subject, and provides the photometry part 21 with a signal for measuring the brightness within the visual field. The projector 17 (and the light acceptor 19) and the photometry part 21 perform the focusing and the photometry, respectively on the basis of the above-mentioned signals, and applies the results to the CPU 30. Moreover, the CPU 30, which receives the full-push signal from the shutter button 11, provides the strobe 20 with a signal for flashing, and provides the shutter 22 with a signal for opening and closing the shutter.

Furthermore, the CPU 30 receives a signal from the telephoto switch 15 or the wideangle switch 16, and controls the above-mentioned lens mirror barrel drive device 14 so that the designated photographing focal length f can be set. Then the CPU 30 calculates a strobe changeover distance on the basis of the photographing focal length f in this case. Incidentally, the calculation of the strobe changeover distance will be described later.

Figure 4A:
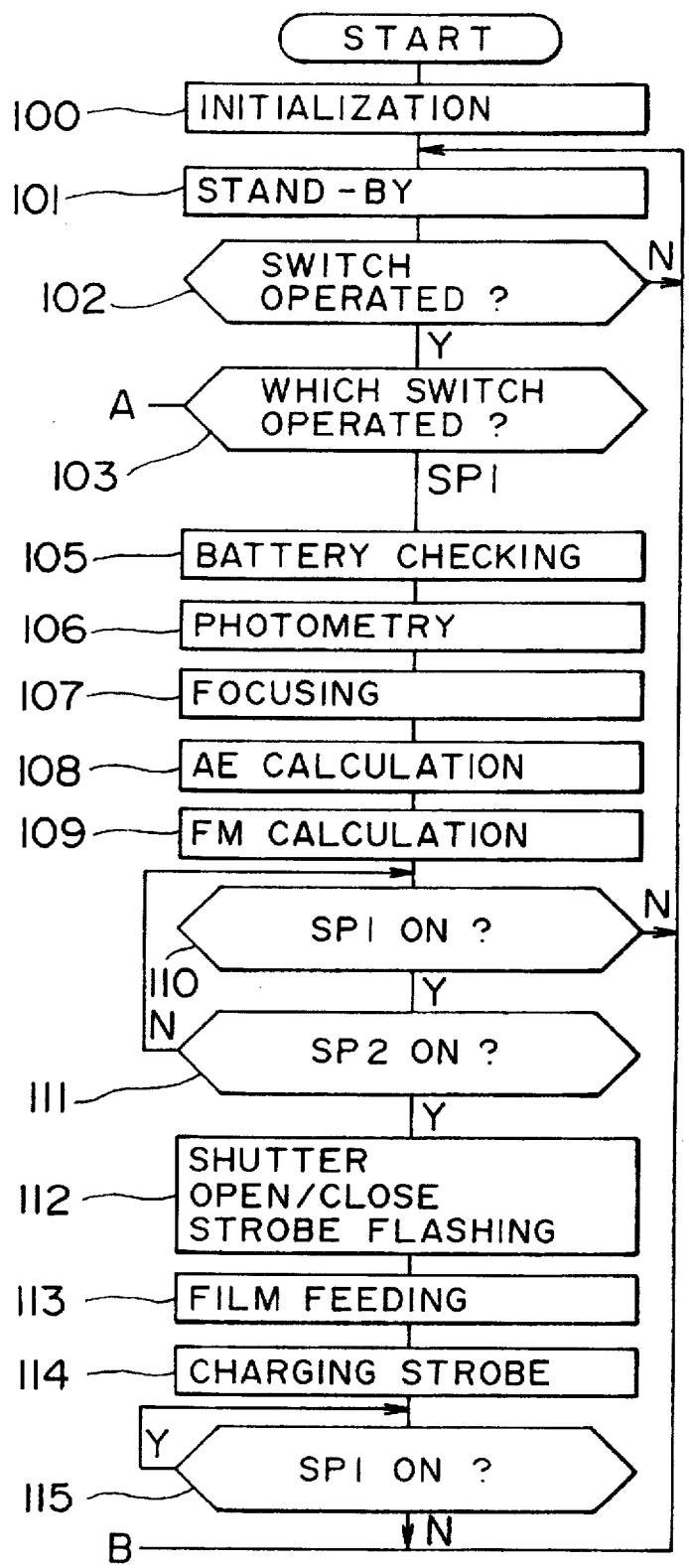
FIGS. 4(a) and 4(b) is a flow chart illustrating a flow of processing for controlling the flash timing.
Figure 4B:
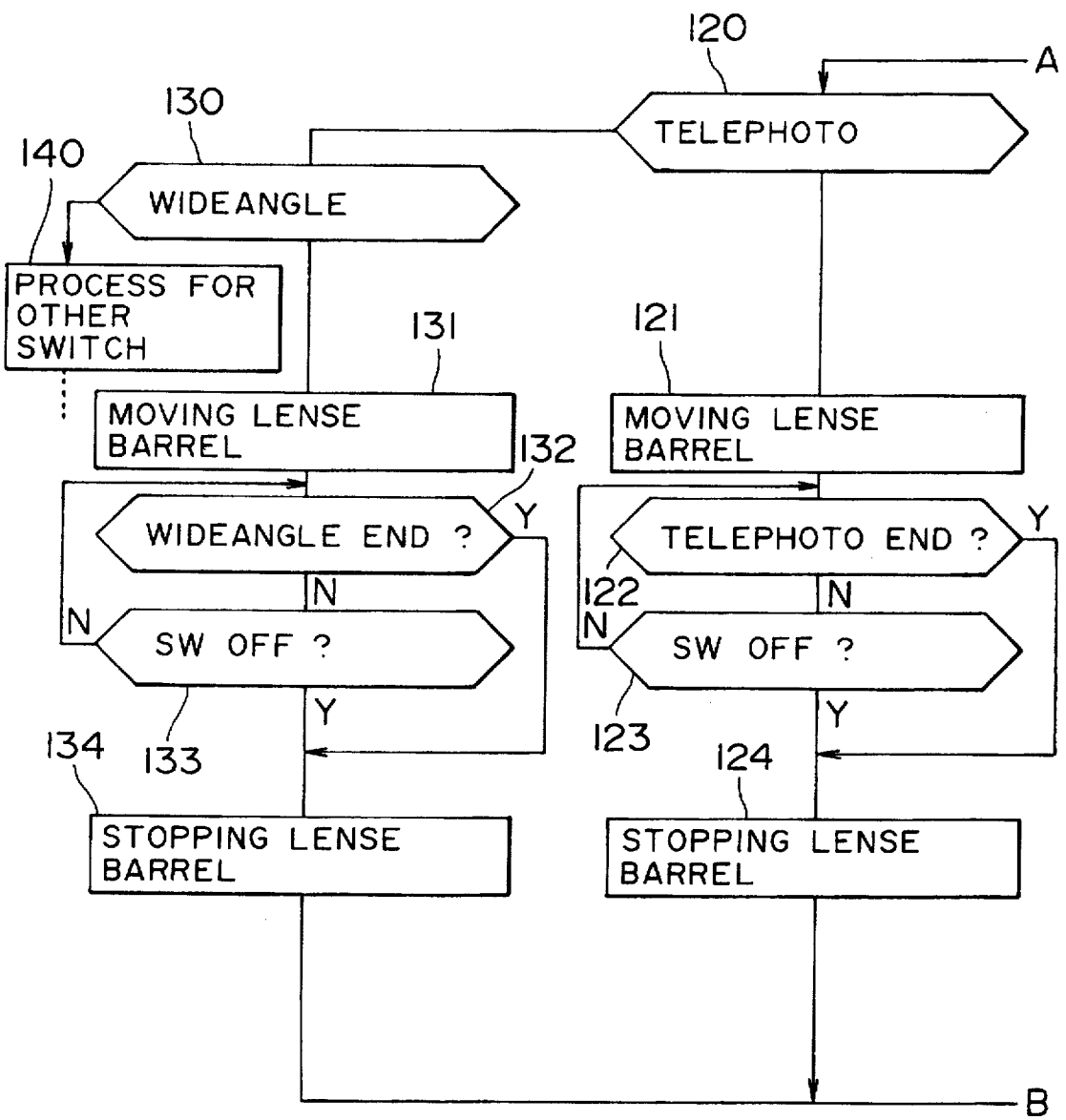

Next, an explanation will be given of a flow in a processing of controlling the flash timing by the CPU 30 on the basis of the control program 31a with reference to the flow chart in FIGS. 4(a) and 4(b).

First, when the power source switch is turned on, the initialization processing such as clearing the memory within the CPU 30 and setting an I/O port, are carried out (Step 100). Then, the processing stands by until some switch is operated (Step 101). Switches include the telephoto switch, the wideangle switch, a self-timer switch, which is not shown in the drawing, in addition to the shutter button 11. Incidentally, as for the focal length of the taking lens 12 in an initial state, the focal length (f=28 mm) in, for example, a wideangle end is a reference focal length f0.

When one of the switches is operated (Step 102), it is detected which switch has been operated (Step 103). When the telephoto switch 15 or the wideangle switch 16 is operated in the step 103, it is detected which one of the telephoto switch 15 and the wideangle switch 16 has been operated (Step 120, Step 130).

When the telephoto switch 15 is operated, the lens is moved so that the focal length can be in a telephoto side (Step 121). Then, it is detected whether the lens has reached a telephoto end or not (Step 122). If not, the lens is moved until the telephoto switch 15 is turned off (Step 123). On the other hand, when the telephoto end is detected in the step 122, or when the telephoto switch 15 is turned off in the step 123, the lens driving is stopped (Step 124). Then the processing returns to the step 101.

On the other hand, when the wideangle switch 16 is operated (Step 130), the lens is moved so that the focal length can be in a wideangle side (Step 131). Then, it is detected whether the lens has reached the wideangle end or not (Step 132). If not, the lens driving is continued until the wideangle switch 16 is turned off (Step 133). On the other hand, if the wideangle end is detected in the step 132, or if the wideangle switch 16 is turned off in the step 133, the lens driving is stopped (Step 134). Then the processing returns to the step 101.

If the switch detected in the step 103 is not one of the shutter button 11, the telephoto switch 15, and the wideangle switch 16, the processing is carried out for the detected switch (Step 140).

When it is detected that the shutter button 11 is pushed half in the step 103, the residual amount of a power source battery is checked (Step 105). Next, the signal is applied from the CPU 30 to the photometry part 21, so that the brightness within a shot visual field is measured at the photometry part 21 (Step 106). Furthermore, the signal is applied from the CPU 30 to the projector 17, so that the projector 17 and the acceptor 19 measures the distance up to the main subject (Step 107). The measurement is carried out based on, for example, a principle of triangulation. Then an apex value (BV) of the external light brightness, which has been found in the step 106, and an apex value (SV) of the film sensitivity are substituted for the following equation (1), so that an exposure value EV, which is a control value for the shutter 19, can be calculated (Step 108). The above mentioned calculation is called an automatic exposure (AE) calculation.

$$EV=SV+BV \tag{1}$$

By the calculation of the EV value, it is possible to determine a combination of the shutter speed and the stop value for obtaining the exposure required for photographing.

Next, an aperture value AV is calculated so as to calculate the flash timing of the strobe 20 (Step 109). This is called a FM (flashmatic) calculation. The AV value corresponds to the opening area of the shutter 22 when the strobe 20 is flashed. That is, it can be judged from the AV value which opening area, which increases gradually after the shutter starts working, is the most appropriate to flash the strobe 20. Therefore, the flash timing of the strobe 20 can be found from the AV value.

In order to calculate the AV value, the distance (D) up to the main subject, which is found in the step 107, is substituted for an equation (2), and a guide number (GNo.) is substituted for an equation (3), so that a DV value and a GV value can be found.

$$DV=-2\log_2 D \tag{2}$$

$$GV=2\log_2 GNo. \tag{3}$$

Figure 5:
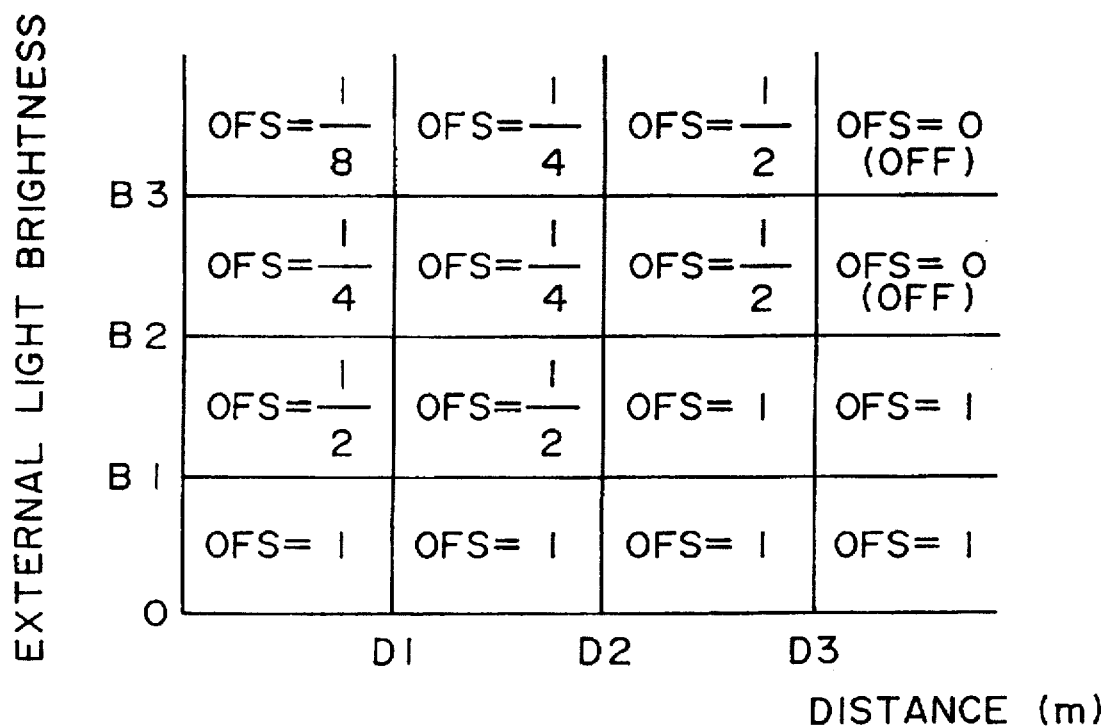
FIG. 5 is a view illustrating one example of a correction table.

Next, an OFS value, which is a correction value, is found from a reference correction table 31b, which is written in the ROM 31, with the current photographing focal length f being taken into consideration. The parameters of the reference correction table 31b are the brightness within the shot visual field in the reference focal length f0, and the distance up to the main subject (a subject distance), as shown in the example of FIG. 5.

In the reference correction table 31b of FIG. 5, the brightness within the shot visual field is classified into 4 levels (below B1, B1–B2, B2–B3, over B3, B1<B2<B3), and the distance up to the main subject is classified into 4 levels (below D1, D1–D2, D2–D3, over D3, D1<D2<D3). Then, the OFS value, which is the correction value for the exposure of the strobe 20, is minutely allotted to each level (see FIG. 5). Basically, because only the external light brightness is not enough for the exposure when the external light brightness is lower than B1, the correction value OFS=1 for decreasing the exposure of the strobe 20, is allotted. When the external light brightness is higher than B1, the correction value OFS=½–⅛ for maintaining the exposure of the strobe 20. In this case, the decreased amount is adjusted to be large when the subject distance is short. Incidentally, the above-mentioned distances D1, D2, and D3 are, for example, 1.3 m, 2 m, and 9 m, respectively, and the strobe exposure is changed over in these distances (hereinafter referred to as a reference changeover distance).

The OFS value can be found from the brightness within the shot visual field, which is measured in Step 106, the distance up to the main subject, which is measured in Step 107, and the photographing focal length f on the basis of the reference correction table 31b.

For instance, when the focal length is the reference focal length f0 (f=28 mm), the subject distance is between D1=1.3 m and D2=2 m, and the brightness is B2–B3; the OFS is found as ¼ in accordance with the reference correction table 31b. When the subject distance is longer than D3=9 m, and the brightness is B1–B2, the OFS is found as 1.

On the other hand, a processing for an optional photographing focal length f is carried out as described below. That is, if the $n_{th}$ reference changeover distance determined with regard to the reference focal length f0 is ordinarily indicated as Dn (f0), the $n_{th}$ strobe changeover distance Dn (f) in the optional photographing focal length f is decided by the following equation:

$$Dn\ (f)=Dn\ (f0)\times f/f0 \tag{4}$$

where n=1, 2, 3 . . . .

Then, the reference correction table 31b is used with the Dn (f) calculated by the above equation.

To be concrete, if the photographing focal length is changed to, for example, f=50 mm, the strobe changeover distance is changed by the equation (4). If each of the distances D1=1.3 m, D2=2 m, and D3=9 m are used, the strobe changeover distance is changed as follows. The first changeover distance D1' is changed to D1×50/28≈2.3 m; the second changeover distance D2' is changed to D2×50/28≈3.6 m; and the third changeover distance D3' is changed to D3×50/28≈16.1. As a result, in the case that the photographing focal length is f=50 mm, OFS=¼ when the distance is between D1' and D2' and the brightness is between B2 and B3, and OFS=1 when the distance is longer than D3' and the brightness is between B1 and B2.

The calculated OFS value is substituted for the following equation (5), so that the FL value can be found.

$$FL = \log_2 OFS \qquad (5)$$

The DV value, the GV value, the FL value, and the film sensitivity (SV), which are found from the above-mentioned equations (1), (2), (3), and (5), are substituted for the following equation (6), so that the AV value can be found (Step 109).

$$AV = GV + SV + DV + FL - 5 \qquad (6)$$

Incidentally, the film sensitivity and the SV value correspond to each other, that is, SV5, 6, 7, 8, 9 . . . correspond to ISO 100, 200, 400, 800, 1600 . . . .

Next, the shutter button 11 is further pushed from the half-push state, and the processing stands by until it is fully pushed (Step 110, 111). If the button is not fully pushed and the finger is removed from the shutter button 11, the processing returns to the step 101. When the shutter button 11 is fully pushed, the shutter 22 is opened and closed so as to take a picture. The opening and closing of the shutter 22 are controlled on the basis of the EV value which is calculated in the step 108. Then, the strobe 20 is flashed at a timing which the aperture area of the shutter 22 equals to the AV value which is calculated in the step 109 (Step 112). The exposure required for photographing can be obtained by the flash of the strobe 20.

The film is fed (Step 113) after the shutter 22 is closed, and the strobe 20 is charged (Step 114). Then, the processing stands by while the shutter button 11 is half pushed (Step 115), and after a finger leaves from the shutter button 11 and the shutter button 11 returns to its original condition, the processing returns to the step 101.

In this embodiment, when the reference correction table 31b is applied to an optional photographing focal length, the strobe changeover distance is changed in accordance with the focal length. This is because the exposure of the subject on the image surface is small when the main subject (for example, a person) occupies a small space in the angle of view (that is, the magnification is small); and the exposure of the subject on the image surface is large when the main subject occupies a large space in the angle of view (that is, the magnification is large); therefore, the contribution by the strobe light is different according to the magnification. The strobe changeover distance is changed in accordance with the photograph focal length so that the exposure of the subject on the image surface can be proper even if the magnification changes.

The ratio of the main subject in the angle of view can be indicated by means of a magnification m on the image surface. The magnification m is usually found by the following equation (7):

$$m = f/(f-d) \qquad (7)$$

where f is a focal length, and D is a subject distance. That is, the magnification m is decided by a ratio D/f between the subject distance D and the focal length f. The $n_{th}$ strobe changeover distance Dn (f) in an optional photographing focal length f can be found based on the above-mentioned equation (4) by means of the $n_{th}$ reference changeover distance Dn (f0) which was decided with regard to the reference focal length f0. Then, the correction table is used as mentioned above so that the exposure of the main subject on the image surface can be proper.

The relationship between the exposure of the strobe 20, which is adjusted based on the reference correction table 31b, and the external light exposure within the shot visual field will hereunder be explained with reference to FIGS. 6, 7, 8, and 9. Incidentally, the film sensitivity is ISO 100 (SV=5) in FIGS. 6, 7, 8, and 9, which corresponds to each distance (below D1, D1-D2, D2-D3, over D3) in the reference correction table 31b.

Figure 6:
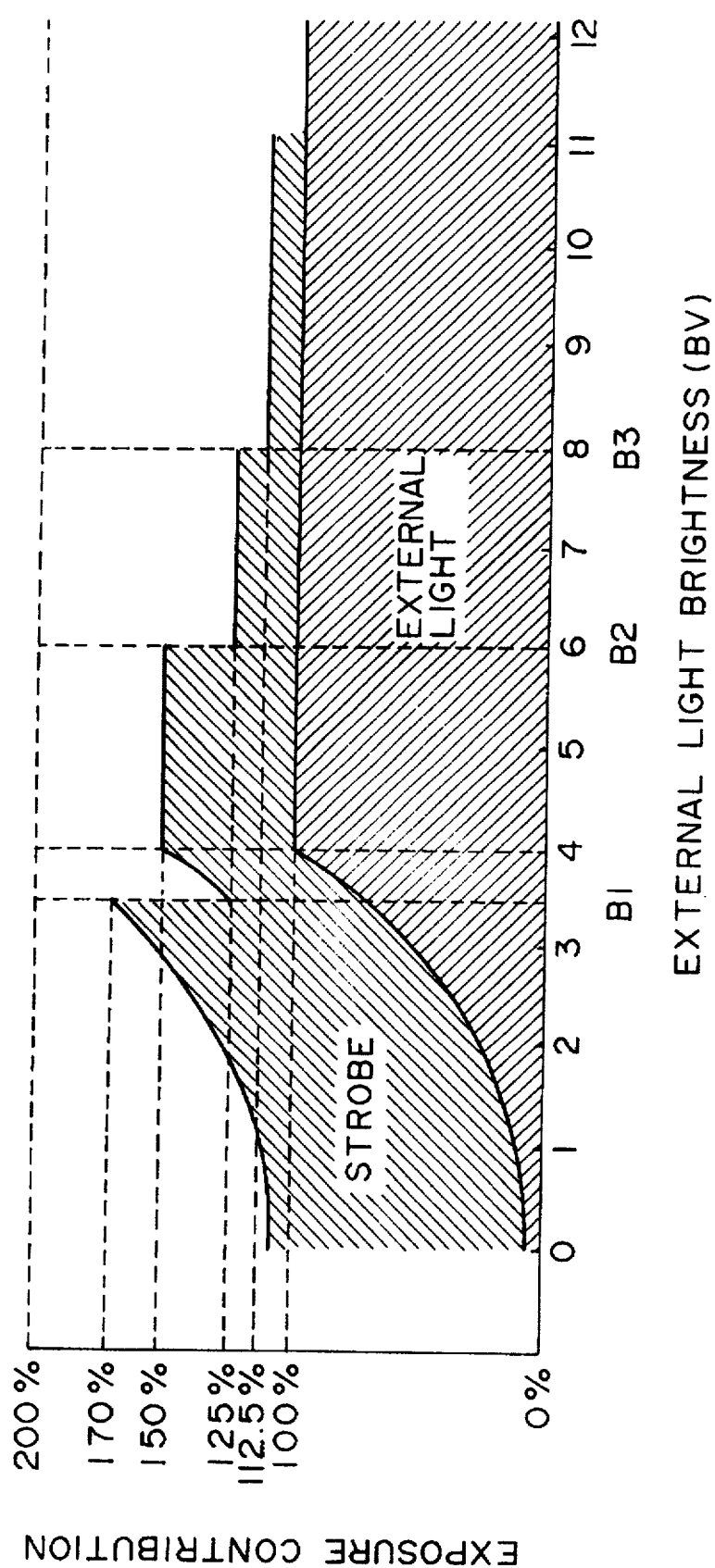
FIG. 6 is a view illustrating a relationship between an exposure of a strobe and an exposure of external light within a shot visual field when a distance between the camera and the main subject is less than D1.

FIG. 6 is a graph showing the relationship between the exposure of the strobe 20 and the external light exposure when the distance up to the main subject is less than D1 in the reference focal length f0. As shown in FIG. 6, when the external brightness is less than BV4, the shutter 22 is opened only for a predetermined constant time, because the shutter should not be opened for more than the predetermined constant time in order to remove the influence of a camera shake. Therefore, a sufficient exposure of 100%, which is required for photographing, is not provided by the external light only. That is, BV4 is the limitation brightness for a so-called automatic exposure (AE) control.

Therefore, the external light exposure keeps increasing until the external brightness reaches BV4. When the external brightness is more than BV4, the shutter 22 is controlled by the AE control, and the external light exposure is adjusted to keep the 100% exposure. As a result, the external light exposure is fixed when the external light brightness is more than BV4.

On the other hand, the exposure of the strobe 20 is 100%, which is required for photographing, when the external light brightness is less than B1. As the external light brightness becomes higher, OFS=1, OFS=½, OFS=¼, OFS=⅛ for the external light brightness below B1, B1-B2, B2-B3, over B3, respectively, are allotted in the correction table 31b.

The total exposure for exposing the film is indicated as the sum of the external light exposure and the strobe exposure. In the brightness (B1), which is lower than BV4 and in which the exposure contribution by the external light gradually becomes larger, the strobe exposure is changed over so as to decrease the exposure contribution by the strobe. That is, the changeover control is carried out to decrease the exposure contribution by the strobe to 50% at the changeover brightness B1. As a result, the total exposure is prevented from being excessively larger than the reasonable exposure. Incidentally, the strobe exposure and the changeover brightness are determined so that the total exposure can always be a reasonable exposure.

Moreover, in the external brightness more than BV4, the exposure of the strobe 20 gradually decreases as the external light brightness becomes higher. That is, the exposure contribution is 50% in the brightness B1-B2 (BV6), 5% in the external light brightness B2-B3, 12.5% in over B3.

Even if the external light brightness is high, when the strobe 20 is flashed so that the exposure of the strobe 20 can be fixed, the ratio of the background to the main subject in the quantity of light is lowered. As a result, the background on the photograph looks dark. In this embodiment, since the exposure of the strobe 20 gradually decreases as the external brightness becomes higher, the ratio of the background to the main subject in the quantity of light is not lowered even if the external light brightness is high. Therefore, even when the photographing is performed in the high brightness, the background on the print is not dark. As a result, the photographic atmosphere is not ruined. Incidentally, as described later, even if the distance up to the main subject is more than D1, the exposure of the strobe 20 is adjusted so as to decrease gradually as the external light brightness becomes higher, so the same effect can be achieved even if the distance up to the main subject is long.

When the distance up to the main subject is less than D1, the exposure of the strobe 20 is extremely small (exposure contribution 12.5%) in the external brightness of more than B4. When the main subject is only a short distance from the camera, the main subject occupies a larger area than the background, so the balance in the quantity of light between the main subject and the background is lost, and the main subject tends to be washed out in the photograph. In this embodiment, the strobe light is controlled to be extremely small when the subject is only at a short distance from the camera and the external light brightness is high. As a result, the balance between the main subject and the background is maintained, and the main subject is prevented from being white on the photograph.

Figure 7:
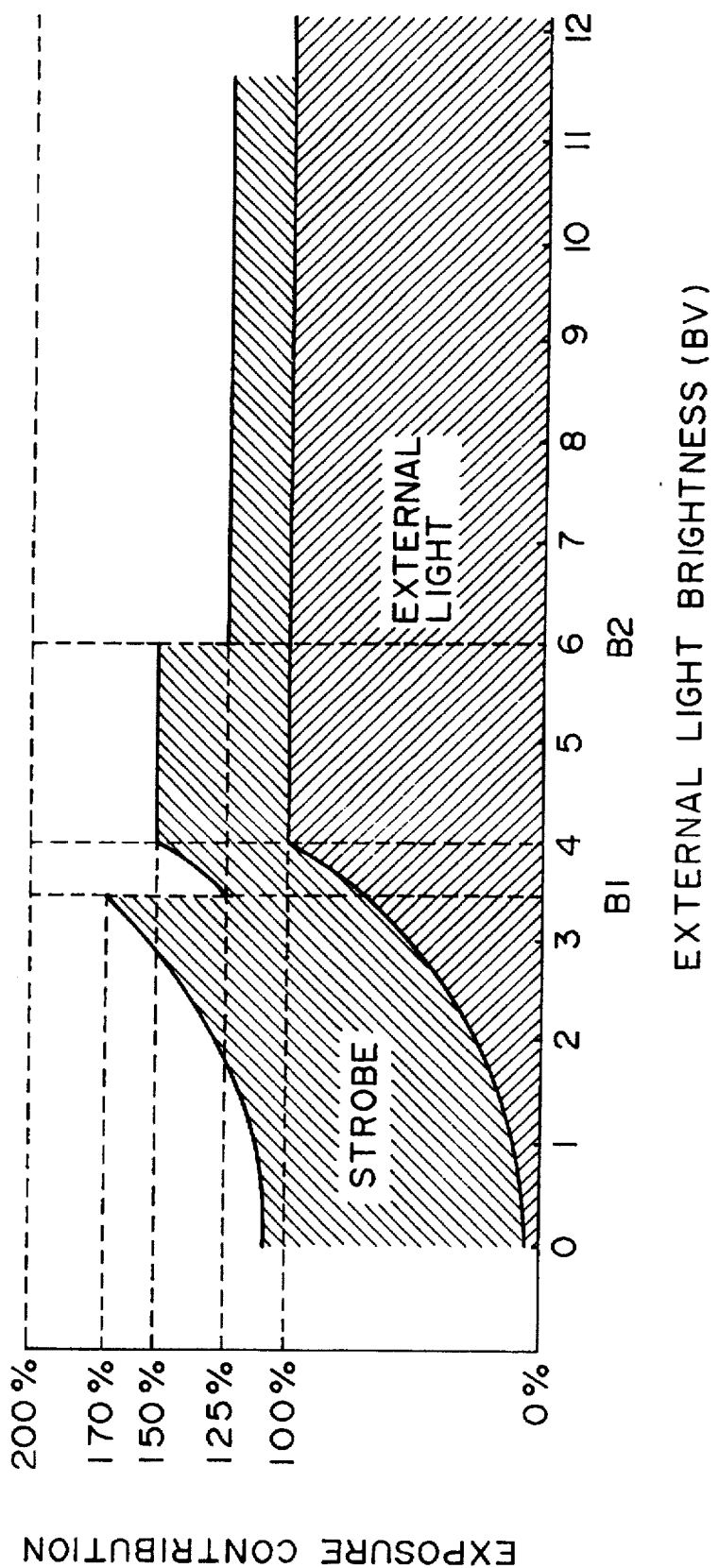
FIG. 7 is a view illustrating a relationship between the exposure of the strobe and the exposure of external light within the shot visual field when the distance between the camera and the main subject is from D1 to D2.

FIG. 7 shows a relationship between the exposure of the strobe 20 and the external light exposure when the distance up to the main subject is D1–D2 in the reference focal length f0. FIG. 7 shows that the external light exposure is the same as in FIG. 6. The exposure of the strobe 20 is the same as in FIG. 6 when the external light brightness is less than B2. However, a processing for decreasing the exposure of the electronic flash 20 to ½ is not carried out even if the external light brightness is more than B3.

It is confirmed by an experiment that the balance in the quantity of light between the main subject and the background is not lost when the distance between the camera and the subject is D1–D2 and the external light brightness is more than B3. Therefore, the processing of decreasing the exposure of the strobe 20 to ½ is not carried out when the external light brightness is B3.

Figure 8:
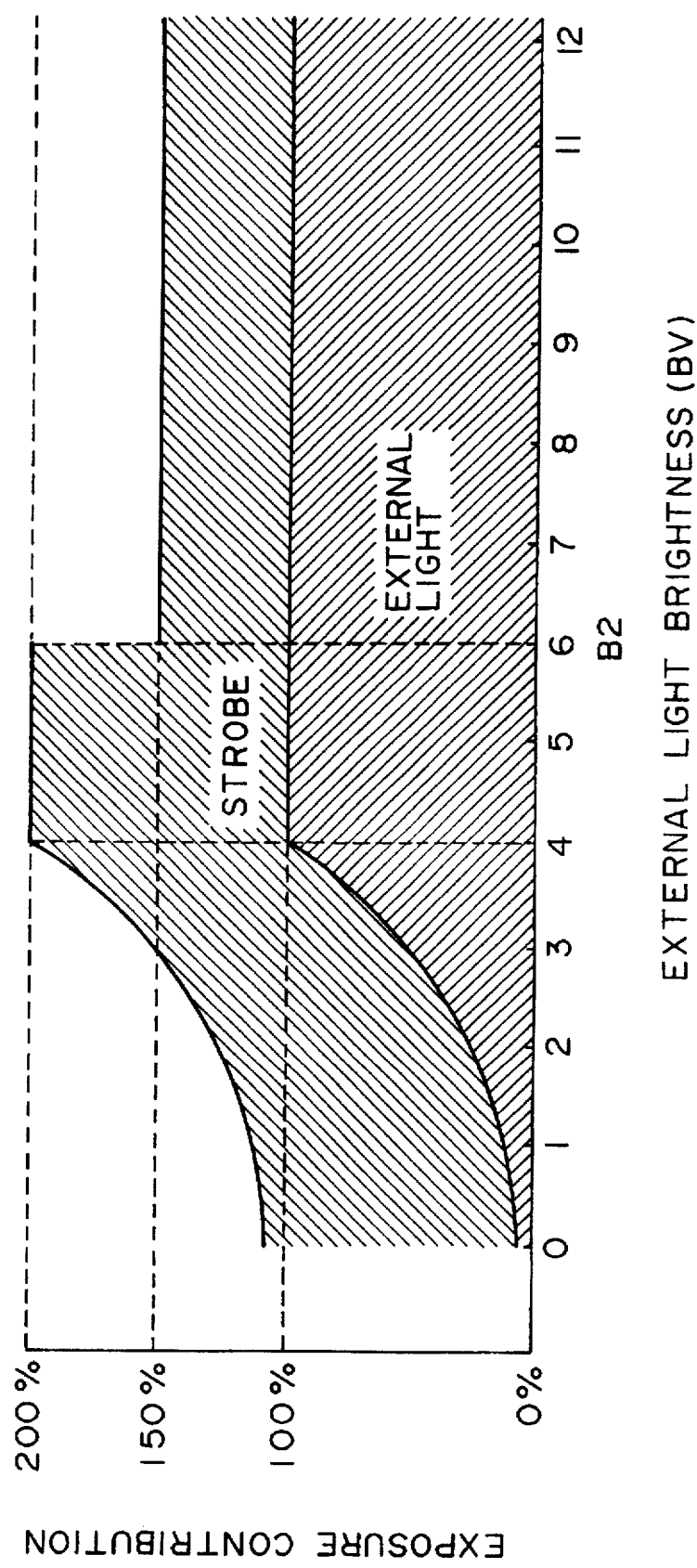
FIG. 8 is a view illustrating a relationship between the exposure of the strobe and the exposure of external light within the shot visual field when the distance between the camera and the main subject is from D2 to D3.

Next, FIG. 8 shows a relationship between the exposure of the strobe 20 and the external light exposure when the distance up to the subject is D2–D3 in the reference focal length f0. FIG. 8 is different from FIG. 7 in that the exposure of the strobe 20 is not decreased when the external light brightness is B1, and the exposure of the strobe 20 is 100% until the external light brightness is B2, and that the processing of decreasing the exposure of the strobe 20 to ½ is not carried out when the external light brightness is B3.

When the distance up to the main subject is more than D2, which is longer than FIG. 7, the effect from decreasing the exposure of the strobe 20 is not conspicuous in the external light brightness of less than BV4, compared with when the main subject is only a short distance from the camera as shown in FIGS. 6 and 7. Furthermore, it is confirmed by an experiment that the balance in the quantity of light between the main subject and the background is hardly lost, even if the total exposure is over the proper exposure in the whole area of the external light brightness.

Figure 9:
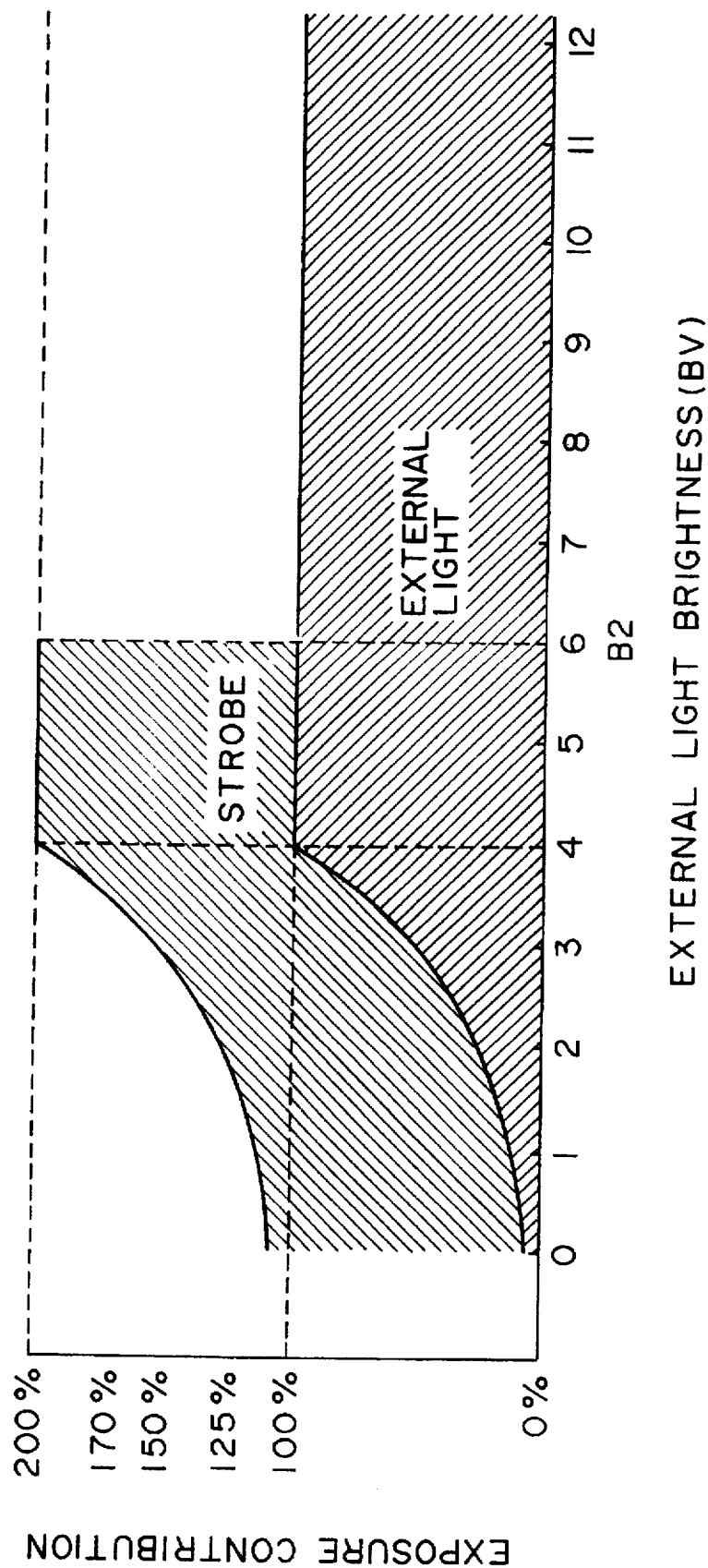
FIG. 9 is a view illustrating a relationship between the exposure of the strobe and the exposure of external light within the shot visual field when the distance between the camera and the main subject is more than D3.

Next, FIG. 9 shows a relationship between the exposure of the strobe 20 and the external light exposure when the distance up to the main subject is more than D3 in the reference focal length f0. FIG. 9 is similar to FIG. 8 in that the exposure of the strobe 20 is 100% until the external light brightness is B2. However, FIG. 9 is different from FIG. 8 in that the strobe 20 is controlled so as not to flash when the external light brightness is more than B2. When the distance up to the main subject is more than D3, the strobe light does not easily reach the subject, and when the external light brightness is more than B2, the photographing is hardly influenced even if the strobe 20 is not flashed.

FIG. 10 is a graph explaining a relationship between the subject distance and the strobe exposure, and shows a relationship between the subject distance and the strobe exposure when the external light brightness is more than B3. Incidentally, the dashed line in the drawing indicates the strobe exposure when the reference focal length is f0=28 mm, and the line indicates the strobe exposure when the photographing focal length is F=50 mm.

In this embodiment, when the reference focal length is f0=28 mm, the strobe changeover distance is set to be D1=1.3 m, D2=2 m, and D3=9 m in accordance with the reference correction table 31b. When the subject distance measured by the focusing part is below D1, D1–D2, D2–D3, and over D3, the strobe exposure is controlled to be ⅛, ¼, ½, and 0(OFF), respectively.

On the other hand, when the photographing focal length is F=50 mm, the strobe changeover distance is changed to D1'≈2.3 m, D2'≈3.6 m, D3'≈16.1 m as mentioned previously. When the subject distance measured by the focusing part is below D1', D1'–D2', and D2'–D3', the strobe exposure is controlled to be ⅛, ¼, ½, and 0(OFF), respectively.

In this embodiment, the explanation was given of the reference correction table 31b which is shown in FIG. 5. However, the mode of the correction table is not limited to this. The external light brightness and the distance up to the main subject may be classified into more or less levels than the reference correction table 31b which is shown in FIG. 5.

Furthermore, the explanation was given of the case that the strobe changeover distance of the reference correction table 31b is changed in accordance with the photographing focal length. The horizontal axis of the correction table may be decided by a value, which is equivalent to a ratio of the main subject in an angle of view, for example, a ratio between the distance and the focal length (D/f). If such a correction table is used, the correction value can be found in accordance with the focal length f and the distance D up to the main subject.

The above explanation relates to the film sensitivity ISO 100, however, the same effect can be achieved with regard to the other sensitivity by sliding the BV value.

Incidentally, the present invention is not limited to the above-mentioned embodiment, and there are variations of the present invention. For example, the exposure is adjusted by subtly shifting the flash timing of the strobe 20 from the shutter timing as shown in FIG. 2. However, the light exposure may be adjusted by changing the quantity of the flash light itself by fixing the flash timing of the strobe 20.

Moreover, the distance between the object and the camera is measured in an active method by means of the projector 17 and the acceptor 19, however, it may be measured in a passive method.

As has been described above, according to the built-in flash camera of the present invention, the strobe changeover distance is set to be long so as to prevent the exposure of the main subject on the image surface from becoming excessively large, because the contribution of the strobe light increases when the photographing focal length is long and the ratio of the main subject in the angle of view is large. As a result, the strobe can be flashed under the optimum exposure even if the photographing focal length is changed. Moreover, the smaller the magnification and the ratio of the main subject within the shot visual field become, the higher the strobe changeover brightness is set in the present invention. Therefore, the strobe can be flashed under the optimum exposure in accordance with the magnification. As a result, it is possible to eliminate the problem of the conventional built-in flash camera in that the exposure on the image surface, which depends on the magnification and the photographing focal length, cannot be appropriately adjust. Therefore, a good picture can be taken.

It should be understood, however, that there is not intention to limit the invention to the specific forms disclosed, but on the contrary, the invention is to cover all modifications, alternate constructions and equivalents falling within the spirit and scope of the invention as expressed in the appended claims.

What is claimed is:

1. A built-in flash camera including a strobe light, the built-in flash camera comprising:

a photometry part for measuring external brightness within a shot visual field;

a focusing part for measuring a distance between the camera and a subject within the shot visual field;

a focal length measuring part for measuring a focal length of a taking lens of the camera;

an automatic exposure mechanism for opening and closing a combination shutter and a stop blade so as to obtain a predetermined exposure upon the measured external brightness being greater than a predetermined reference external light brightness, the predetermined reference external light brightness being an external light brightness at which an optimum exposure is obtained when the shutter is open for a predetermined time; and a strobe light control part for controlling the strobe light to flash regularly in connection with the opening and closing of the shutter and for decreasing the exposure of the strobe gradually from the predetermined exposure in accordance with the measured brightness, the measured distance, and the measured focal length, the strobe light control part setting strobe changeover distances D, distances at which the strobe exposure is varied, to be relatively long as the focal length at photographing becomes long and to be relatively short as the focal length becomes relatively short, wherein the strobe exposure is variable at a plurality of strobe changeover distances, each dependent upon the measured focal length.

2. A built-in flash camera as set forth in claim 1, wherein the strobe changeover distances Dn(f) are defined with respect to the reference focal length of f0 of the taking lens and reference changeover distance Dn(f0), and wherein the strobe light control part determines the strobe changeover distances for the measured focal length (f) as distances Dn(f) defined by relation:

$Dn(f) = Dn(f0) \times f/f0$ for $n = 1, 2, 3, \ldots$

3. A built-in flash camera including a strobe light, the built-in flash camera comprising:

a photometry part for measuring external brightness within a shot visual field;

a focusing part for measuring a distance between the camera and a subject within the shot visual field;

a magnification measuring part for measuring a photographic magnification;

an automatic exposure mechanism for opening and closing a combination shutter and a stop blade so as to obtain a predetermined exposure upon the measured external brightness being greater than a predetermined reference external light brightness the predetermined reference external light brightness being an external light brightness at which an optimum exposure is obtained when the shutter is open for a predetermined time; and a strobe light control part for controlling the strobe light to flash regularly in connection with the opening and closing of the shutter and for changing the exposure of the strobe gradually from the predetermined exposure in accordance with the measured brightness, the measured distance, and the measured magnification, the strobe light control part setting strobe changeover brightness to be relatively high as a ratio of the main subject in the shot visual field, calculated from the measured magnification and the measured distance, becomes relatively small, and to be relatively low as the ratio becomes relatively large.

4. The built-in flash camera of claim 1, wherein the strobe exposure is further varied based upon the measured brightness.

5. The built-in flash camera of claim 3, wherein the strobe changeover brightness is increased as the measured distance is increased up to a predetermined distance, and the strobe light is controlled so as not to flash when the measured distance is greater than the predetermined distance.

* * * * *